Patented Dec. 19, 1922.

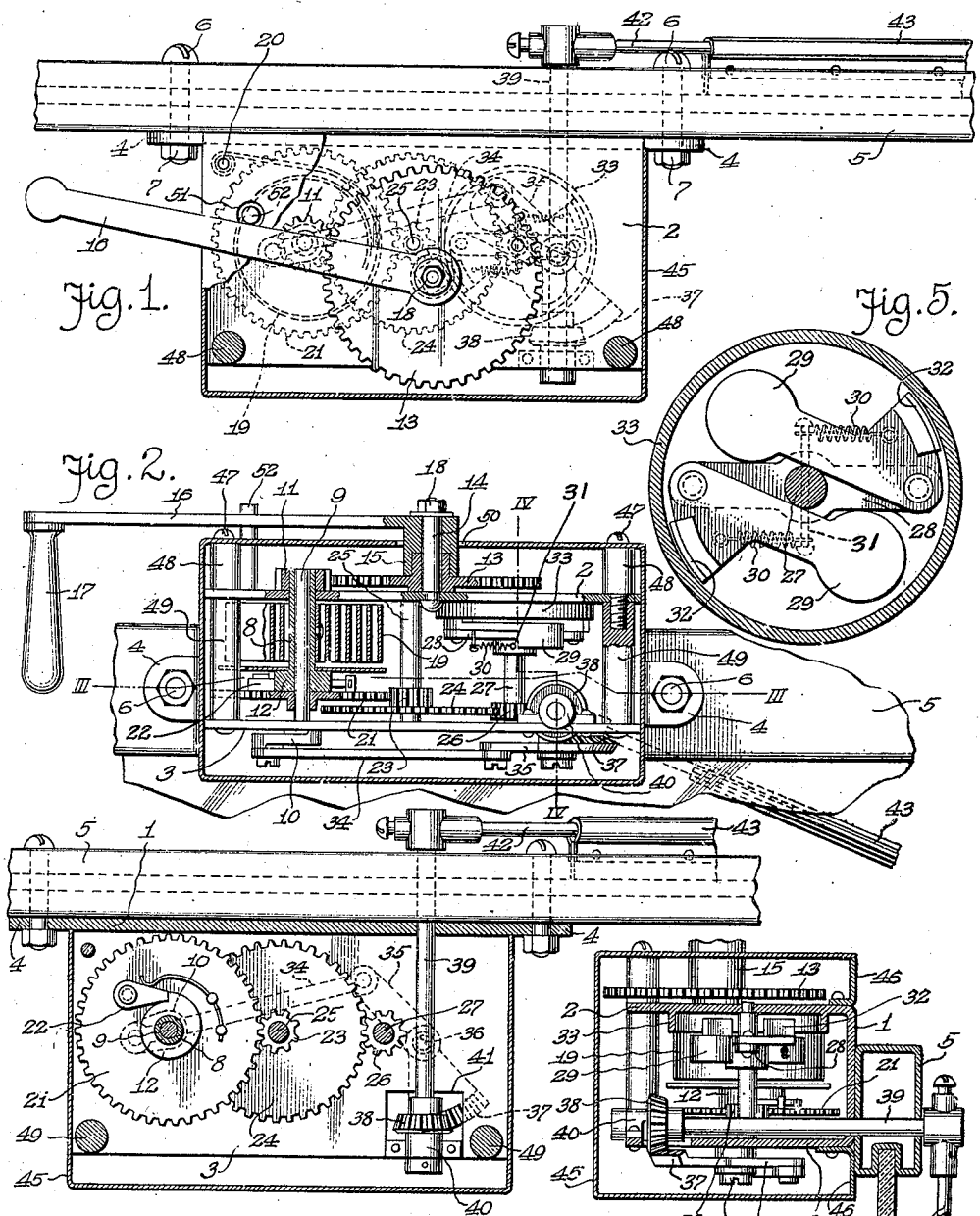

1,439,309

UNITED STATES PATENT OFFICE.

JOHN G. HALLER AND HERMAN C. NICHOLAUS, OF DETROIT, MICHIGAN.

WINDSHIELD-CLEANING DEVICE.

Application filed January 21, 1922. Serial No. 530,775.

*To all whom it may concern:*

Be it known that we, JOHN G. HALLER and HERMAN C. NICHOLAUS, citizens of the United States of America, residing at Detroit, in the county of Wayne and State of Michigan, have invented certain new and useful Improvements in Windshield-Cleaning Devices, of which the following is a specification, reference being had therein to the accompanying drawings.

In our pending application filed Dec. 27, 1921, Serial No. 525,182 there is disclosed a windshield cleaning device operated by a spring motor that is wound or placed in an operative condition by a key which must be intermittently actuated, and as a result of the spring motor being placed in an operative condition, a wiping or scraping arm may be released, to be oscillated against the face of a shield or window, to scrape or otherwise remove snow, sleet rain and other matter which might accumulate thereon and obscure vision. The key of the spring motor necessitated numerous turns or actuations in order to place the spring motor in full operative condition or completely wound, and now we have a windshield cleaning device, which includes a spring motor and means by which the motor by one stroke of the lever, may be placed in an operative condition fully wound up.

We also have a windshield cleaning device wherein the operating mechanism is more compactly arranged, and this mechanism will be hereinafter specifically described and then claimed.

Reference will now be had to the drawing, wherein—

Figure 1 is a plan of a portion of the windshield provided with the cleaning device, which is partly broken away and partly in section;

Fig. 2 is a vertical longitudinal sectional view of a windshield cleaning device;

Fig. 3 is a horizontal sectional view taken on the line III—III of Fig. 2;

Fig. 4 is a vertical cross sectional view of the device, taken on the line IV—IV of Fig. 2, and Fig. 5 is an enlarged horizontal sectional view of a governor forming part of the device.

In the drawing, the reference numeral 1 denotes a channel shaped support having top and bottom walls 2 and 3 respectively and end apertured lugs 4, said lugs being attached to a windshield frame 5 or other support by screw bolts 6 and nuts 7 or other fastening means. The support 1 is maintained against the frame 5, as best shown in Fig. 4, with the walls 2 and 3 horizontally disposed.

Journaled in the wall 2, at one end thereof, is a tubular winding arbor 8 through which extends a crank shaft 9 having a crank end 10 thereof journaled in the wall 3 and at one end of the winding arbor 8 is a small gear wheel 11, while at the opposite end thereof is a ratchet wheel 12. Meshing with the small gear wheel 11 is a large gear wheel 13 rotatable on a post 14 carried by the wall 2 and loose on the post 14 and detachably connected to the gear wheel 13 is a socket portion 15 of a crank 16, said crank having a suitable handle 17. The socket portion 15 of the crank 16 may be held in engagement with the gear wheel 13 by a nut 18 or other fastening means on the upper end of the post 14. By swinging the crank 16 in an arc of one hundred and eighty degrees the large gear wheel 13 receives a half rotation and the small gear wheel 11 a plurality of rotations, depending on the ratio of teeth between the large and small gear wheels.

Attached to the tubular winding arbor 8 is the inner end or convolution of a spiral band spring 19 which has its outer end or convolution attached to a post 20 connecting the walls 2 and 3 of the support 1.

Fixed on the crank shaft 9 is a large gear wheel 21 provided with a spring pressed pawl 22 normally engaging the ratchet wheel 12 of the tubular winding arbor 8, as best shown in Fig. 3, and when the spring 19 is wound up or placed in an operative condition the spring pressed pawl 22 recedes over the ratchet wheel, but eventually engages the ratchet wheel so that clockwise rotation of the winding arbor 8, under the influence of the expansive force of the spring 19 rotates the large gear wheel 21. This large gear wheel meshes with a small gear wheel 23 integral with a large gear wheel 24 on a shaft 25 supported by the walls 2 and 3, and the large gear wheel 24 meshes with a small gear wheel 26 on a governor shaft 27 supported by the walls 2 and 3. On the upper end of the governor shaft 27 is a cross head 28 provided with horizontally disposed centrifugally actuated governor arms 29, said arms being retained in a retracted position by the retractile force of springs 30 connecting said governor arms to a transverse pin 31, carried by the governor shaft. The pivoted ends of the governor arms 29 have brake shoes 32 adapted to engage a depending annular brake member or flange 33 carried by the wall 2. With the brake shoes 32 riding against the brake member 33 the governor will retard or prevent any excessive rotation of the governor shaft 27 and consequently maintain a uniform or steady operation of the spring motor.

The crank end 10 of the shaft 9 is connected by a pitman 34 to a bell crank 35 pivoted on a depending post 36, carried by the bottom wall 3 of the support 1, and said bell crank has a segment gear 37 meshing with a beveled gear wheel 38 on an oscillatory arm shaft 39, journaled in the support 1 and a bearing 40 on the wall 3, said wall being cut away, as at 41 to provide clearance for the beveled gear wheel 38.

The arm shaft 39 extends through the windshield frame 5 and is provided with a detachable wiper arm 42 on which is mounted a suitable wiper or scraping member 43 normally engaging the outer face of the pane of glass 44 mounted in the windshield frame. The wiper or scraper member may be of any well known form adapted to remove rain, snow, sleet or foreign matter from the outer face of the windshield.

Enclosing the spring motor and the greater part of the mechanism just described is a rectangular casing 45 and rear wall members 46, said rear wall members being suitably connected to the rear edges of the top and bottom walls 2 and 3 respectively. The casing 45 is held in position relative to the walls 2 and 3 by screws 47 entering spacing members 48 and 49, the former being between the top wall 2 and the top of the casing 45 and the latter between the walls 2 and 3, as best shown in Fig. 2. The top wall of the casing 45 has two openings 50 and 51, the former providing clearance for the socket portion 15 of the crank 16, and the latter providing clearance for a stop or stud 52, carried by the top wall 2, and against which stop or stud the crank 16 is normally held by the spring motor. As our device is now constructed the crank 16 is normally maintained at the left hand end of the casing 45 and said crank may be swung to the right hand end of the casing to wind up the spring motor. As the spring motor causes the wiper or scraper member 43 to be oscillated or swung back and forth against the outer face of the windshield, the crank 16 is slowly swung and restored to its normal position at the left hand end of the casing.

It is obvious that the crank 16 and the stud or stop 52 must be removed when mounting or dismounting the casing 45.

It is thought that the operation and utility of our windshield cleaning device will be apparent without further description, and it is obvious that various changes may be made without departing from the scope of the appended claims.

What we claim is:—

1. A spring motor adapted to operate a member, and means including a bell crank operated by said motor and segment gear, and beveled gear for transmitting power from said spring motor to said member.

2. The combination of a spring motor, a shaft, a member on said shaft, means including a pitman, bell crank, segment gear and beveled gear operated by said spring motor for oscillating said member, and means including gear wheels and a crank adapted for winding said spring motor.

3. The combination set forth in claim 2, and a governor operated by said spring motor and adapted to prevent excessive speed of said motor.

4. An operating mechanism comprising top and bottom walls, a spring motor between said walls, an arm shaft on the bottom wall, a member carried by said shaft, means below said bottom wall adapted to be operated by said spring motor to oscillate said arm shaft, and means above said top wall adapted to be swung to wind said spring motor.

5. An operating mechanism as in claim 4, and a governor between said top and bottom walls controlling the operation of said spring motor.

In testimony whereof we affix our signatures in presence of two witnesses.

JOHN G. HALLER.
HERMAN C. NICHOLAUS.

Witnesses:
ANNA M. DORR,
KARL H. BUTLER.